(12) United States Patent
Fietz et al.

(10) Patent No.: US 9,862,475 B2
(45) Date of Patent: Jan. 9, 2018

(54) DRAINAGE END CAP DEVICE FOR DRAINING FLUID FROM A HOLLOW SPACE IN A VEHICLE

(71) Applicant: AIRBUS HELICOPTERS DEUTSCHLAND GMBH, Donauworth (DE)

(72) Inventors: Helmut Fietz, Tapfheim (DE); Kaspar Von-Wilmowsky, Donauworth (DE); Frank Singer, Sauerlach (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 105 days.

(21) Appl. No.: 14/958,404

(22) Filed: Dec. 3, 2015

(65) Prior Publication Data

US 2016/0159454 A1    Jun. 9, 2016

(30) Foreign Application Priority Data

Dec. 3, 2014    (EP) .................................... 14400051

(51) Int. Cl.
*B64C 1/00*    (2006.01)
*B64C 1/14*    (2006.01)
*F16L 37/084*    (2006.01)

(52) U.S. Cl.
CPC .......... *B64C 1/1453* (2013.01); *F16L 37/084* (2013.01)

(58) Field of Classification Search
CPC ................. B64C 1/1453; F16L 37/084; B01D 2253/108; B01D 2253/342; B01D 53/02; B01D 53/047; B01D 53/06; B01J 20/183; B01J 20/186; B01J 20/28028; B01J 20/28035; B01J 20/28042; B01J 20/30; B01J 20/3078; B01J 20/32; Y10T 137/6906; Y10T 137/87949;
(Continued)

(56) References Cited

U.S. PATENT DOCUMENTS 1,784,157 A * 12/1930 Oglesby .................. G09F 21/16
                                                            239/171
2,325,018 A *  7/1943 Moss ...................... G01L 27/00
                                                            73/861.68
(Continued)

FOREIGN PATENT DOCUMENTS

DE        102005003436       8/2005
EP           0556765          8/1993
(Continued)

OTHER PUBLICATIONS

European Search Report for European Application No. EP 14400051, Completed by the European Patent Office dated Jun. 23, 2015, 7 Pages.

*Primary Examiner* — Medhat Badawi
(74) *Attorney, Agent, or Firm* — Brooks Kushman P.C.

(57) ABSTRACT

A drainage end cap device for draining fluid from a hollow space in a vehicle, comprising a mounting unit that is durably mountable in a super-imposed manner onto a drainage opening provided in an outer shell of a vehicle, wherein a drainage cap with a drainage channel is provided, the drainage cap being removably mountable to the mounting unit and the drainage channel being at least partly zigzagged over a longitudinal extension of the drainage cap.

13 Claims, 12 Drawing Sheets

(58) Field of Classification Search
CPC . Y10T 137/4857; Y02T 50/166; Y02T 50/46; Y02T 50/44; B64D 39/06; B63B 27/24
See application file for complete search history.

(56) References Cited

U.S. PATENT DOCUMENTS

| | | | | |
|---|---|---|---|---|
| 2,408,774 A * | 10/1946 | Goddard | | B64D 1/16 137/68.13 |
| 2,428,585 A * | 10/1947 | Rogers | | F16L 37/008 114/185 |
| 3,073,096 A * | 1/1963 | Hayes, Jr. | | F24F 3/14 159/4.08 |
| 3,433,146 A * | 3/1969 | Russell | | F24C 15/20 126/299 E |
| 3,535,930 A * | 10/1970 | Rees | | B64D 15/12 219/201 |
| 3,667,371 A * | 6/1972 | Russell | | F24C 15/2035 126/299 D |
| 3,938,972 A * | 2/1976 | Sugimura | | B01D 45/08 55/440 |
| 4,271,025 A * | 6/1981 | Erdmannsdorfer | | B01D 29/216 210/487 |
| 4,354,648 A * | 10/1982 | Schenk | | B64C 3/58 244/130 |
| 4,364,517 A * | 12/1982 | Etheridge | | B64D 1/18 239/171 |
| 4,437,487 A * | 3/1984 | Marmon | | F16K 15/18 137/322 |
| 4,715,561 A * | 12/1987 | Spinosa | | B64C 1/1453 137/430 |
| 5,290,996 A * | 3/1994 | Giamati | | B64C 1/1453 219/201 |
| 5,380,049 A * | 1/1995 | Smowton | | F16L 37/084 285/148.2 |
| 5,552,576 A * | 9/1996 | Giamati | | B64C 1/1453 219/201 |
| 5,636,875 A * | 6/1997 | Wasser | | F16L 37/084 156/73.5 |
| 5,655,732 A * | 8/1997 | Frank | | B64C 1/1453 239/171 |
| 5,803,512 A * | 9/1998 | Hollnagel | | F16L 35/00 285/319 |
| 5,996,938 A * | 12/1999 | Simonetti | | B64C 1/1453 244/129.1 |
| 6,211,494 B1 * | 4/2001 | Giamati | | B64C 1/1453 219/201 |
| 6,382,314 B1 * | 5/2002 | Doll | | B29C 51/00 165/164 |
| 6,425,554 B1 * | 7/2002 | Moreland | | B64D 11/02 244/1 R |
| 6,435,452 B1 * | 8/2002 | Jones | | B64C 1/1453 244/1 A |
| 6,439,506 B1 * | 8/2002 | Schlegel | | B64D 37/02 137/202 |
| 6,733,047 B1 * | 5/2004 | Stieler | | F16L 37/0987 285/21.1 |
| 6,776,183 B1 * | 8/2004 | Brooker | | B64C 1/1453 137/216 |
| 7,097,131 B2 * | 8/2006 | Palmer | | B64D 37/20 244/1 A |
| 7,121,512 B2 * | 10/2006 | Bonnaud | | B64D 29/02 244/117 A |
| 7,207,604 B2 * | 4/2007 | Wilson | | F16L 37/086 285/305 |
| 7,546,981 B2 * | 6/2009 | Hoffjann | | B64C 1/1453 244/136 |
| 8,444,732 B2 * | 5/2013 | Bratton | | B01D 45/06 55/440 |
| 8,602,353 B2 * | 12/2013 | Lindauer | | B64D 11/02 244/118.5 |
| 2004/0069243 A1* | 4/2004 | Ishiguro | | B01D 45/06 122/32 |
| 2004/0146339 A1* | 7/2004 | Lutzer | | B64C 1/1453 403/226 |
| 2005/0230547 A1* | 10/2005 | Giamati | | B64D 11/02 244/129.1 |
| 2006/0249628 A1* | 11/2006 | Turner | | B64D 11/02 244/136 |
| 2006/0254973 A1* | 11/2006 | Olsen | | B01D 25/001 210/338 |
| 2006/0273224 A1* | 12/2006 | Hoffjann | | F16L 5/08 244/136 |
| 2009/0133376 A1* | 5/2009 | Zysman | | B64C 1/1453 60/39.08 |
| 2011/0009849 A1* | 1/2011 | Christensen | | A61M 25/0075 604/540 |
| 2011/0089681 A1* | 4/2011 | Schutte | | F16L 37/084 285/148.19 |
| 2011/0121137 A1* | 5/2011 | Sandiford | | B64C 1/1453 244/136 |
| 2011/0271982 A1* | 11/2011 | Herbold | | B08B 7/02 134/6 |
| 2012/0286095 A1* | 11/2012 | Giamati | | B64C 1/1453 244/136 |
| 2012/0305553 A1* | 12/2012 | Brotzell | | B65D 90/08 220/23.83 |
| 2013/0193271 A1* | 8/2013 | Otero | | B64C 1/1453 244/136 |
| 2014/0124161 A1* | 5/2014 | Han | | B60H 1/00335 165/42 |
| 2015/0021438 A1* | 1/2015 | Casado Montero | | B64C 1/1453 244/136 |
| 2015/0075662 A1* | 3/2015 | Lee | | B64C 1/1453 137/899.2 |
| 2015/0289388 A1* | 10/2015 | Conway | | H05K 5/0021 312/236 |
| 2015/0289389 A1* | 10/2015 | Conway | | B65D 21/0209 220/4.02 |
| 2016/0118317 A1* | 4/2016 | Shedd | | F25B 23/006 257/712 |
| 2016/0159454 A1* | 6/2016 | Fietz | | B64C 1/1453 244/129.1 |

FOREIGN PATENT DOCUMENTS

| | | |
|---|---|---|
| EP | 0672583 | 9/1995 |
| EP | 1084952 | 3/2001 |
| EP | 1621459 | 2/2006 |
| FR | 2907099 | 4/2008 |
| FR | 2971485 | 8/2012 |

* cited by examiner

DRAINAGE END CAP DEVICE FOR DRAINING FLUID FROM A HOLLOW SPACE IN A VEHICLE

CROSS REFERENCE TO RELATED APPLICATION

This application claims priority to European patent application No. EP 14 400051.0 filed on Dec. 3, 2014, the disclosure of which is incorporated in its entirety by reference herein.

BACKGROUND OF THE INVENTION (1) Field of the Invention

The invention is related to a drainage end cap device for draining fluid from a hollow space in a vehicle, comprising a mounting unit that is durably mountable in a superimposed manner onto a drainage opening provided in an outer shell of a vehicle. The invention is further related to a drainage cap for draining fluid from a hollow space in a vehicle, and to an aircraft comprising a drainage end cap device.

(2) Description of Related Art

Hollow spaces in vehicles are generally subject to accumulation of liquid, such as condense water, which need to be drained from such hollow spaces in order to avoid a degradation of the vehicles, e.g. due to corrosion. In more specific cases, other liquids than condense water may ingress into respective hollow spaces. For instance, fuel may unintentionally ingress into hollow spaces that are existent in fuel compartments of vehicles adjacent to fuel tanks thereof. This ingressed fuel may evaporate, whereby explosive gases are created, so that the hollow spaces must not only be drained to remove the ingressed fuel, but also permanently be vented to prevent any accumulation of explosive gases. Consequently, by drainage and venting of the hollow spaces accumulation of explosive and/or inflammable fluids, i.e. gases and/or liquids, in the hollow spaces is prevented so that any potential fire or explosion risk can be prevented.

The document EP 1 084 952 A2 describes fuel tanks of an aircraft that is embodied as a helicopter, wherein the fuel tanks are provided with specific vent valves and venting channels, and wherein the vent valves are configured to prevent ingression of fuel from the fuel tanks into the venting channels. Nevertheless, even if these venting channels are considered as defining hollow spaces, the document EP 1 084 952 A2 does not describe particular drainage measures for these venting channels and further does not describe any means for drainage and venting of hollow spaces that are defined in the vicinity of the fuel tanks.

One basic solution for draining and venting hollow spaces of an aircraft consists in providing through holes, e.g. through a lower outer shell of a fuselage of such an aircraft, with one or more drainage channels leading into a respective hollow space. However, when providing a rotary wing aircraft, such as a helicopter, with corresponding through holes in a lower side of its fuselage defining an outer or bottom shell, water may ingress via these through holes into the respective hollow space depending on an underlying flight mode of the helicopter.

For instance, during hovering of the helicopter over water close to the water surface, spray water may occur in response to turbulences created by rotor downwash of the main rotor. The spray water may ingress via the through holes into the respective hollow space, which may thus be filled with water. This is particularly problematic in cases where the spray water is salty sea water that acts in the respective hollow space as an electrolytic solution triggering a very fast galvanic, corrosive reaction with metallic parts existing in the respective hollow space.

Furthermore, during ditching of the helicopter water would ingress into the respective hollow space via the through holes. A solution for avoiding such an ingression of water during ditching consists in providing corresponding through holes in the bottom shell with check valves consisting of a cap and a weir gate. These check valves are adapted to ensure ventilation of associated hollow spaces via the through holes during flight and to seal the through holes by a corresponding weir gate's lift when sufficient water pressure is applied to the weir gate during ditching of the helicopter.

However, these check valves are not suitable to avoid ingression of spray water into the hollow spaces, as such spray water would not apply a sufficient water pressure onto the weir gates. Furthermore, such check valves frequently comprise metallic components which are, as such, prone to corrosion, especially when in contact with salty sea water. Additionally, the metallic components may influence the electromagnetic compatibility of the helicopter, as they could be caught by radar. Moreover, such check valves frequently exhibit a comparatively huge installation height. Finally, such check valves would not operate successfully when the helicopter fuselage is exposed to icing conditions, because their movable components, i.e. the weir gates, could be frozen to a fixed position.

A more reliable solution for avoiding ingression of water into a hollow space defined in the region of a bottom shell of a helicopter consists in providing corresponding through holes in the bottom shell with manually lockable plugs, which can be opened manually on ground to drain fluids that were accumulated in the hollow space during flight. Such manually lockable plugs are relocked after a corresponding drainage operation and remain sealingly closed during flight.

However, such drain plugs are not admissible with respect to hollow spaces defined in the vicinity of fuel tanks in the helicopter according to the relevant EASA/FAR-certification regulations, as such drain plugs do not allow a permanent venting of the hollow spaces. As already mentioned above, such hollow spaces must be drained and vented permanently to prevent any accumulation of explosive and/or inflammable fluids in the hollow spaces in order to exclude any potential fire or explosion risk. A permanent drainage and venting does, however, not exist when the drain plugs are sealingly closed during flight.

Still other drainage and venting options are described in the documents DE 10 2005 003 436 A1, EP 0 556 765 A1 and EP 0 672 583 A1 in terms of drainmasts for aircrafts in general. These drainmasts are adapted for draining wastewater from aircrafts and are mounted integrally, i.e. as one piece to the aircrafts. However, these drainmasts have a comparatively huge installation height and are also not suitable to avoid ingression of spray water into associated hollow spaces provided in the aircrafts.

One possibility for avoiding such an ingression of spray water into hollow spaces defined in the region of a bottom shell of a helicopter could be the provision of an active ventilator with a protective cap. However, such an active ventilator would require an electric current for operation and needs to be protected itself against spray water and ingress of water. Furthermore, such an active ventilator is expensive and only suitable for venting and protecting against ingress of spray water, but not for drainage purposes.

The document FR 2 907 099 A1 describes a drainage end cap device for an aircraft with a drainage end cap that is provided with a drainage channel. The drainage end cap is removably mounted to a mounting structure that, in turn, is rigidly attached to a support structure, which is provided inside a fuselage of the aircraft. The mounting structure defines an attachment base that protrudes through an opening provided in the fuselage and the drainage end cap is removably mounted to the attachment base by means of screws.

The document US 2006/0273224 A1 describes another drainage end cap device for an aircraft with a drainage end cap that is provided with a drainage channel. A mounting structure is provided and rigidly attached to a fuselage of the aircraft, and the drainage end cap is removably mounted to the mounting structure and the fuselage by means of screws.

The documents EP 1 621 459 A1 and FR 2 971 485 A1 describe other drainage devices with drainage channels. In these drainage devices, the drainage channels are kinked with an angle of 90°.

BRIEF SUMMARY OF THE INVENTION

It is, therefore, an object of the present invention to provide a new drainage and venting device which ensures drainage and permanent venting of hollow spaces at least in aircrafts according to the relevant EASA/FAR certification regulations independent of a given flight mode, while securely preventing ingression of spray water into the hollow spaces.

This object is solved by a drainage end cap device for draining fluid from a hollow space.

More specifically, according to the present invention the drainage end cap device is adapted for draining fluid from a hollow space in an aircraft and, more preferably, in a rotary wing aircraft such as a helicopter. However, it should be noted that the drainage end cap device according to the present invention may likewise be applied to other vehicles having hollow spaces that need to be drained and vented and is, therefore, not limited to use with aircrafts or helicopters. The drainage end cap device according to the present invention comprises a mounting unit that is durably mountable in a super-imposed manner onto a drainage opening provided in a outer shell of such a vehicle. According to one aspect, a drainage cap with a drainage channel is provided, which is removably mountable to the mounting unit. The drainage channel is at least partly zigzagged over a longitudinal extension of the drainage cap.

It should be noted that in the context of the present invention the terms "drainage" of a fluid and "draining" fluid from a hollow space generally refer to eliminating fluids from the hollow space. Accordingly, this refers not only to removal of liquids from the hollow space by means of drainage, but also to removal of gases from the hollow space by means of venting.

According to one aspect, the drainage end cap device of the present invention is adapted for mounting to an helicopter fuselage having a drainage opening in order to control fluid exchange between an associated hollow space and an outside of the fuselage. Thus, liquids such as, e.g., fuel and in particular kerosene accumulated in the hollow space are drained to the outside driven by gravity and air is exchanged between the hollow space and the outside for venting of gases, so that the hollow space is permanently vented. Furthermore, liquids from the outside and especially salty sea water are prevented from entering the hollow space, even in the form of spray water. Consequently, exposition of metallic parts in the hollow space to corrosive influences due to ingression of electrolytic liquids into the hollow space is at least reduced and, preferably, essentially prevented.

Advantageously, the drainage end cap device according to the present invention does not comprise any movable parts, which could freeze when operated in icing conditions, so that its functionality cannot be altered by icing conditions. Preferably, the drainage end cap device according to the present invention is composed of at least two separate constituent components that can be easily and quickly assembled and disassembled. These at least two separate constituent components preferably comprise at least one mounting unit that is rigidly fixed to the helicopter fuselage, e.g. by means of screwing, riveting and/or gluing, and a drainage cap that is removably mounted to the mounting unit, e.g. by means of a snap-fit and/or form-fit connection. Such a snap-fit and/or form-fit connection allows for a fast mounting and dismounting of the drainage cap from the mounting unit for exchange and cleaning purposes.

The mounting unit and the drainage cap are preferably realized as plastic components that can be easily and inexpensively manufactured, e.g. by means of a suitable plastic injection molding process. Thus, the inventive drainage end cap device can be installed in the vicinity of antennas of the helicopter, as it has no effect on electromagnetic compatibility. Furthermore, it cannot corrode due to absence of metallic components.

Preferably, at least the drainage cap comprises an optically transparent plastic material that ensures visible contact of the drainage opening for clearance approval and inspection purposes. Advantageously, the drainage cap and, more generally, the drainage end cap device are located in the fuselage's streamline of flow to minimize flow losses. In particular, at least the drainage cap can be shaped aerodynamically and streamlined to the helicopter's fuselage and preferentially exhibits a comparatively low installation height. Thus, the aerodynamic drag of the drainage cap is minimized in forward flight of the helicopter.

According to one aspect, the drainage channel of the drainage cap is at least partly zigzagged, e.g. in the form of a labyrinth or a meander. Preferably, the drainage channel is built up from plane channel walls, which are arranged such that any incoming fluid would immediately strike a channel wall frontally, preferentially in a 90° angle, when it enters the drainage channel. Accordingly, a basic channel shape may consist of a single L-shaped channel element. However, by adding more angled shapes together, i.e. by serializing two or more L-shaped channel elements, the blocking effect of the drainage channel for a heavier portion of an entering fluid, such as water drops, is increased and, therefore, ameliorated.

Advantageously, the channel walls are oriented in normal operation of the helicopter to the gravity's direction, such that the heavier portion of the entering fluid, i.e. the water drops, will never be kept within the drainage channel by gravity, but will drain out of the drainage cap through a corresponding fluid outlet. Therefore, the channel walls of the drainage channel are preferably oriented in an angle of at least essentially 0° to the gravity.

According to a preferred embodiment, said drainage cap is removably mountable to said mounting unit by means of a snap-fit connection.

According to a further preferred embodiment, said drainage cap comprises a blocking member unit that is adapted for creating said snap-fit connection to said mounting unit.

According to a further preferred embodiment, said blocking member unit comprises at least one blocking member that is lockable by an associated blocking element of said mounting unit.

According to a further preferred embodiment, a fixation unit is provided for creating said snap-fit connection to said mounting unit, said fixation unit being removably mountable to said drainage cap for retaining said drainage cap at said mounting unit in a mounted state.

According to a further preferred embodiment, said fixation unit comprises at least one blocking member that is lockable by an associated blocking element of said mounting unit for blocking said fixation unit at said mounting unit, said fixation unit further comprising at least one fixation unit abutting surface that is adapted for abutting in said mounted state against an associated drainage cap abutting surface of said drainage cap for blocking said drainage cap at said mounting unit.

According to a further preferred embodiment, said mounting unit comprises a retaining element and said drainage cap comprises a collar, said collar being at least retainable in said retaining element.

According to a further preferred embodiment, said retaining element defines a guide element that is adapted for guiding said collar during mounting of said drainage cap onto said mounting unit.

According to a further preferred embodiment, said drainage cap comprises a housing that accommodates said drainage channel, said housing being provided with a fluid inlet and a fluid outlet that are interconnected by said drainage channel, said housing having a height that increases over a longitudinal extension of said drainage cap from said fluid inlet in direction of said fluid outlet.

According to a further preferred embodiment, said housing is aerodynamically shaped over said longitudinal extension from said fluid inlet in direction of said fluid outlet.

According to a further preferred embodiment, said drainage channel comprises channel walls that are at least substantially perpendicular to said mounting unit in a mounted state of said drainage cap on said mounting unit.

According to a further preferred embodiment, said channel walls comprise at least four wall segments, wherein at least two wall segments are at least essentially parallel to each other, and wherein at least two wall segments are at least essentially perpendicular to each other.

According to a further preferred embodiment, said at least four wall segments define at least one L-shaped channel section.

According to a further preferred embodiment, said at least two wall segments that are at least essentially parallel to each other are spaced from one another by a distance that amounts approximately to at least one third of an overall drainage cap width.

According to a further preferred embodiment, each one of said at least four wall segments comprises a length that is greater than said distance.

According to a further preferred embodiment, at least one of said at least four wall segments defines an angle of at least approximately 45° with respect to a fluid outlet of said drainage cap.

According to a further preferred embodiment, said drainage cap comprises a transparent plastic.

According to a further preferred embodiment, said mounting unit is provided with at least one spacer that points away from said drainage cap in a mounted state of said drainage cap on said mounting unit.

The present invention moreover provides an aircraft with an outer shell that comprises a drainage opening for draining fluid from a hollow space in said aircraft, comprising a drainage end cap device with a mounting unit that is durably mounted on said outer shell and super-imposed onto said drainage opening, wherein said drainage end cap device comprises a drainage cap with a drainage channel, said drainage cap being removably mounted to said mounting unit. Said drainage channel is at least partly zigzagged over a longitudinal extension of said drainage cap.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
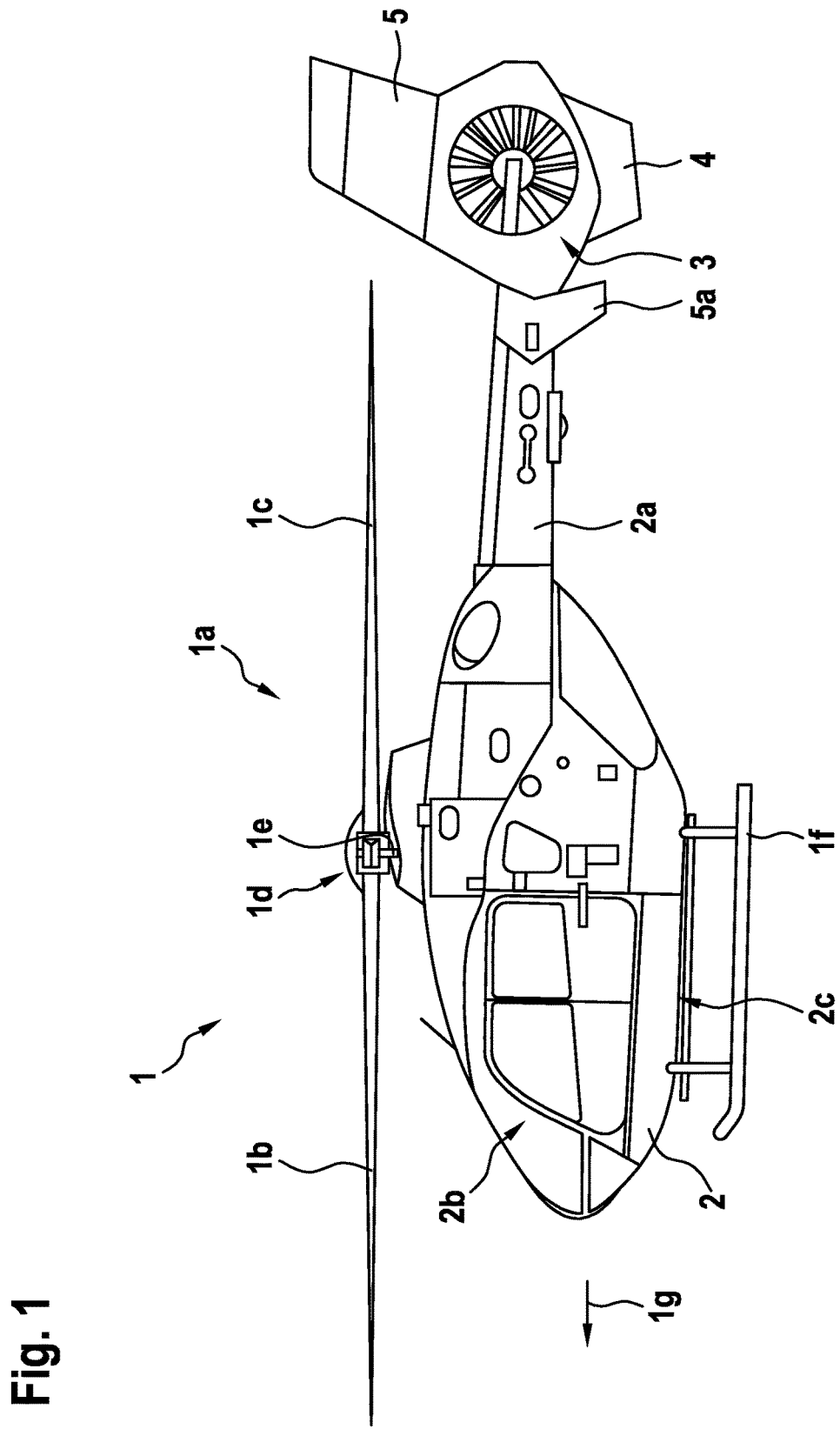
FIG. 1 shows a lateral view of a helicopter according to the invention.

FIG. 1 shows a vehicle 1 that is exemplarily illustrated as an aircraft, in particular as a rotary-wing aircraft and, more particularly, as a helicopter. Thus, for purposes of simplicity and clarity, the vehicle 1 is hereinafter referred to as the "helicopter" 1. It should, however, be noted that the present invention is not limited to helicopters and can likewise be applied to any other vehicle, independent of a particular configuration thereof.

Illustratively, the helicopter 1 is adapted for flying in operation into a main flight direction 1g and comprises a fuselage 2 that is connected to a landing gear 1f and defines a tail boom 2a and a cabin 2b with an outer wall 2c. This outer wall 2c may be defined by the fuselage 2 itself or by a cover covering the fuselage 2 in the region of the landing gear 1f and is, therefore, also referred to as the "outer shell 2c".

The helicopter 1 further comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, the helicopter 1 further comprises at least one preferentially shrouded counter-torque device 3 configured to provide counter-torque during operation, i.e. to counter the torque created by rotation of the at least one multi-blade main rotor 1a for purposes of balancing the helicopter 1 in terms of yaw. The at least one counter-torque device 3 is illustratively provided at an aft section of the tail boom 2a, which preferably further comprises a bumper 4, a tail wing 5a and a fin 5. The tail wing 5a is preferably adjustable in its inclination and can, thus, overtake the functioning of a horizontal stabilizer. Alternatively, or in addition, the helicopter 1 is provided with a suitable horizontal stabilizer.

Figure 2:
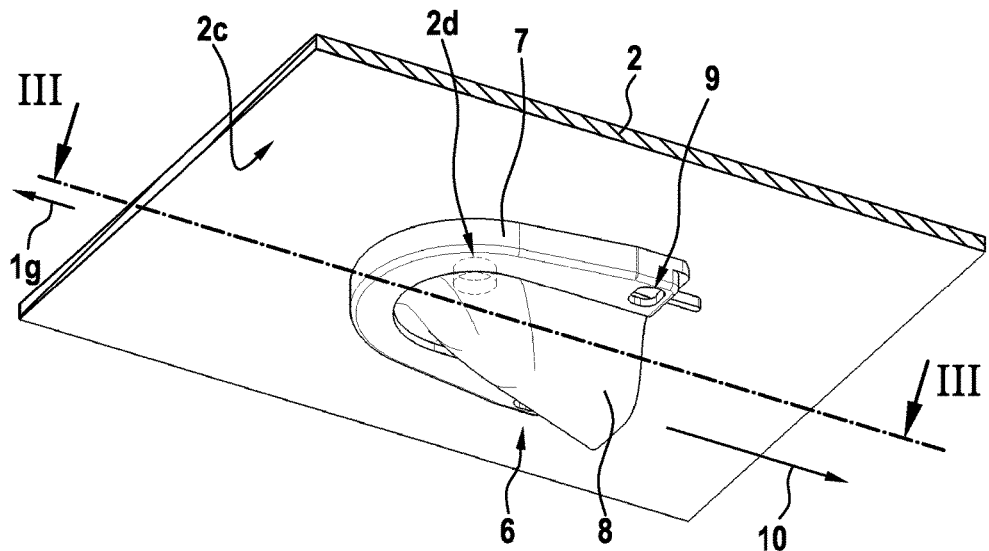
FIG. 2 shows a perspective view of a section of a lower fuselage side of the helicopter of FIG. 1, which is provided with a drainage end cap device that is embodied according to a first embodiment and comprises a mounting unit and a drainage cap.

FIG. 2 shows a section of the outer shell 2c of the fuselage 2 of the helicopter 1 of FIG. 1, which is illustratively provided with a drainage opening 2d and a drainage end cap device 6 according to a first embodiment of the present invention. According to one aspect, this drainage end cap device 6 is adapted for draining fluid from a hollow space (11b in FIG. 5) defined in the helicopter 1 of FIG. 1 via the drainage opening 2d, which is illustratively embodied as a through hole through the outer shell 2c.

It should be noted that the fuselage 2 can be provided with more than one drainage openings, wherein at least one and preferably each drainage opening is provided with a drainage end cap device according to the present invention. Likewise, the drainage opening 2d as such may be built up by more than one opening. However, for simplicity and clarity only the single drainage opening 2d and the single drainage end cap device 6 are shown.

Preferably, the drainage end cap device 6 comprises a mounting unit 7 that is durably mounted to the outer shell 2c of the fuselage 2 in the region of the drainage opening 2d provided in the outer shell 2c. For instance, the mounting unit 7 is screwed, riveted and/or glued to the outer shell 2c. According to the present invention, the drainage end cap device 6 further comprises a drainage cap 8 that is removably mounted to the mounting unit 7 and adapted to allow a flow of drained fluid there through in a flow direction that is schematically illustrated with an arrow 10.

According to one aspect, each one of the mounting unit 7 and the drainage cap 8 is embodied as an integral, i.e. one-piece plastic component and manufactured by means of a plastic injection molding process or any other suitable manufacturing process. The mounting unit 7 is preferably manufactured using a material with excellent glue connection parameters. Preferably, at least the drainage cap 8 is manufactured, at least partly and preferentially completely, using a transparent plastic.

Figure 3:
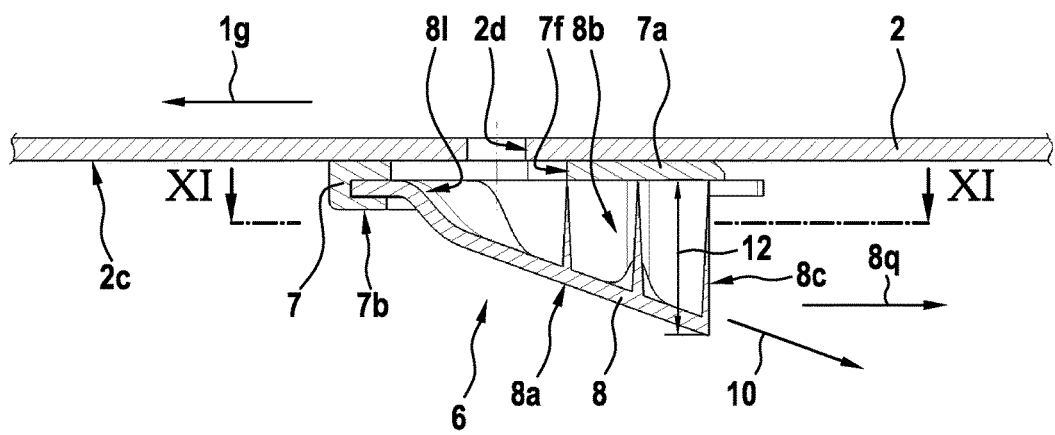
FIG. 3 shows a sectional view of the arrangement of FIG. 2, seen in direction of arrows III-III of FIG. 2.

FIG. 3 shows the section of the outer shell 2c of the fuselage 2 that is provided with the drainage end cap device 6 with the mounting unit 7 and the drainage cap 8 according to FIG. 2, for further illustrating the arrangement of the drainage end cap device 6 in the region of the drainage opening 2d. More specifically, according to one aspect the mounting unit 7 comprises a carrier 7a with a retainer 7b. Preferably, the carrier 7a comprises an opening 7f that is arranged congruent to the drainage opening 2d of the outer shell 2c, i.e. in a super-imposed manner, and embodied as a through hole through the carrier 7a, which is, preferentially, durably mounted to the outer shell 2c, as described above with reference to FIG. 2.

The drainage cap 8 preferably comprises a housing 8a that is provided with a collar 8j, which is retained by the retainer 7b of the mounting unit 7, preferentially in a form-fit manner. The housing 8a preferably accommodates a drainage channel 8b.

More specifically, the housing 8a is provided with a fluid inlet 8l and a fluid outlet 8c that are interconnected by the drainage channel 8b. According to one aspect, the housing 8a is aerodynamically shaped over a longitudinal extension of the drainage cap 8 in a direction pointing from the fluid inlet 8l to the fluid outlet 8c, as illustrated with an arrow 8q. Preferably, the housing 8a has a height 12 that increases over its longitudinal extension in the direction of the arrow 8q from the fluid inlet 8l to the fluid outlet 8c.

Figure 4:
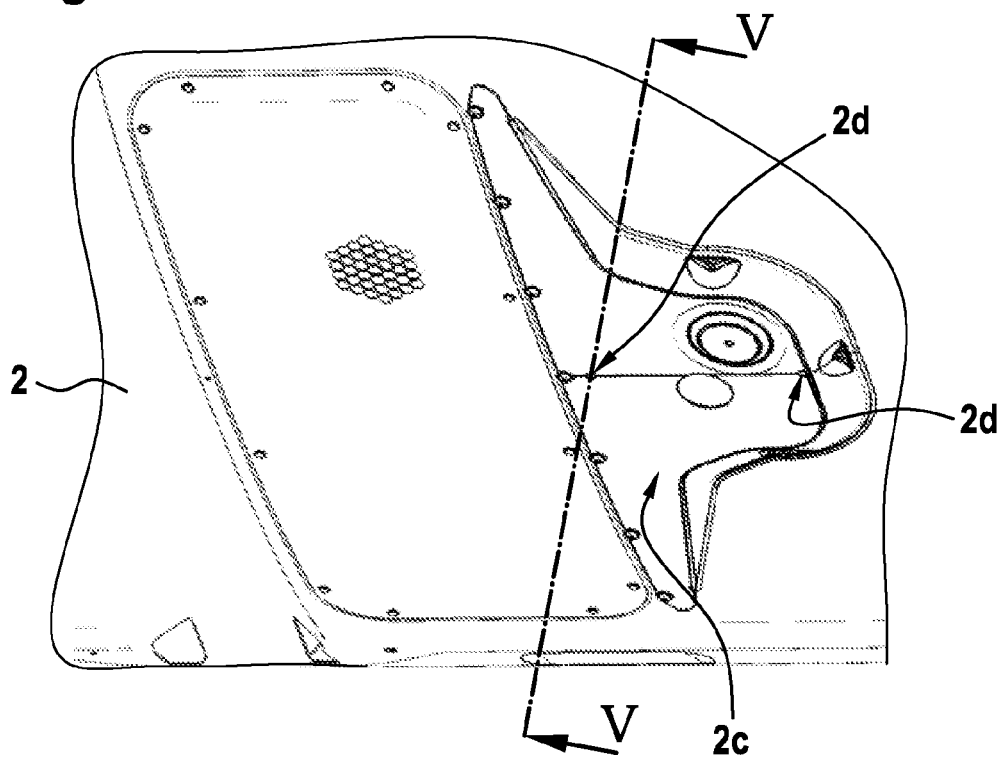
FIG. 4 shows a plan view of a lower fuselage side of the helicopter of FIG. 1.

FIG. 4 shows the outer shell 2c of the fuselage 2 of the helicopter 1 of FIG. 1 in the region of the landing gear 1f of FIG. 1, for further illustrating the drainage opening 2d of FIG. 2 and FIG. 3. Illustratively, two drainage openings are shown in the outer shell 2c, both of which are designated with the reference sign 2d for simplicity and clarity. At least one of these two drainage openings 2d is provided with the drainage end cap device 6 of FIG. 2 and FIG. 3 as described above.

Figure 5:
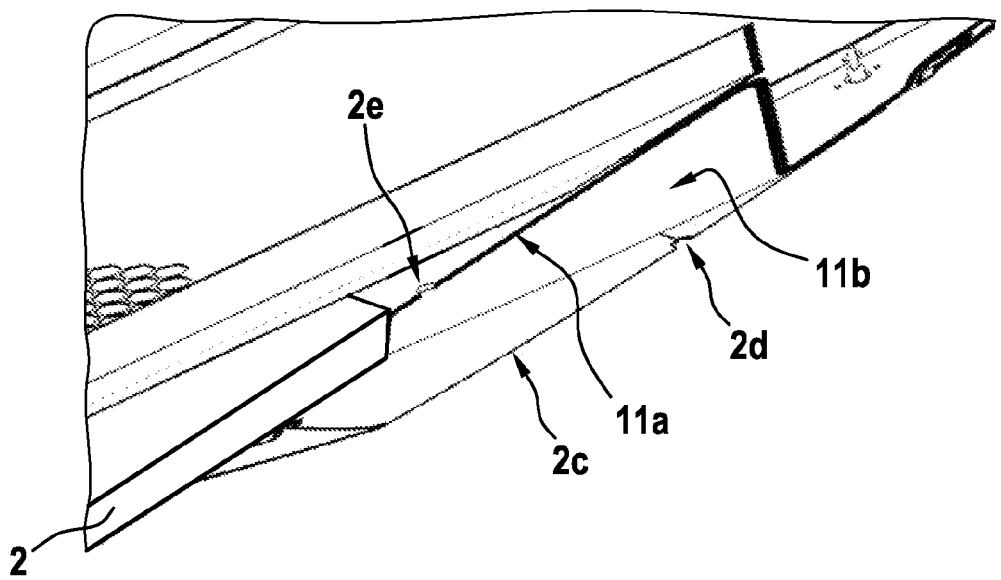
FIG. 5 shows a sectional view of the lower fuselage side of FIG. 4 with a hollow space, seen in direction of arrows V-V of FIG. 4.

FIG. 5 shows the outer shell 2c of the fuselage 2 according to FIG. 4 for illustrating a hollow space 11b, which is exemplarily defined between the outer shell 2c and an inner wall 11a. According to one aspect, the inner wall 11a is defined by the fuselage 2 and the outer shell 2c is defined by a cover that covers an outside of the fuselage 2 in the region of the landing gear 1f of FIG. 1. However, other implementations are also possible and likewise contemplated within the context of the present invention. For instance, the inner wall 11a can be implemented by a fuel tank wall and the outer shell 2c by the fuselage 2, and so on.

In the illustrated example, the inner wall 11a is additionally provided with venting openings 2e. The latter are illustratively defined as through holes through the inner wall 11a. By way of example, the venting openings 2e are at least provided in order to allow venting of the space above the inner wall 11a, i.e. opposed to the hollow space 11b, while the drainage openings 2d are provided in order to allow at least draining (which comprises venting according to the definition given above) of the hollow space 11b.

Figure 6:
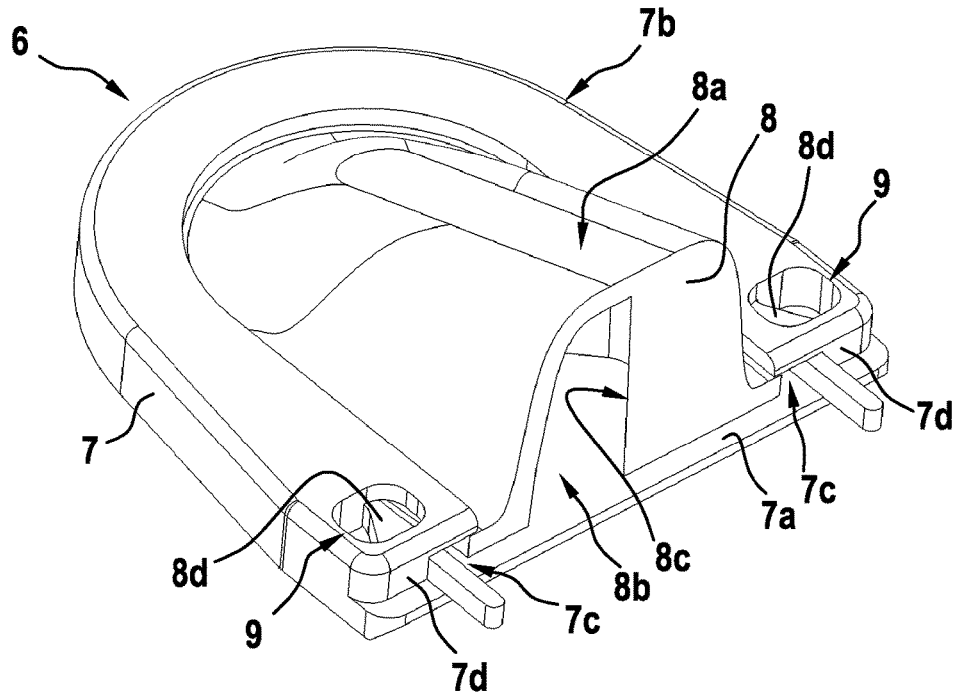
FIG. 6 shows the drainage end cap device of FIG. 2.

FIG. 6 shows the drainage end cap device 6 with the mounting unit 7 and the drainage cap 8 according to FIG. 2 and FIG. 3 in mounted state for further illustrating the fluid outlet 8c of the drainage cap 8 and the retainer 7b of the mounting unit 7. As described above, the mounting unit 7 is durably mountable in a super-imposed manner onto the drainage opening 2d provided in the outer shell 2c according to FIG. 2 and FIG. 3, and the drainage cap 8 with the drainage channel 8b is removably mountable to the mounting unit 7.

According to the present invention, the drainage cap 8 is removably mountable to said mounting unit 7 by means of a snap-fit connection. In order to enable such a snap-fit connection, the mounting unit 7 preferably comprises at least one and illustratively two blocking elements 7d that are illustratively arranged at the retainer 7b of the mounting unit 7. The retainer 7b further defines a guide 7c, which is preferably implemented as a guide groove and adapted for receiving and guiding the drainage cap 8 during mounting, i.e. its collar 8j. Preferentially, the retainer 7b and the carrier 7a are formed integrally, i.e. in one piece.

According to one aspect, the retainer 7b and, consequently the guide 7c are at least approximately U-shaped with two opposed legs and the two blocking elements 7d are arranged at laterally opposed free opened ends of the legs of the retainer 7b, i.e. the guide 7c. These blocking elements 7d are preferably embodied as end stops that are embodied for blocking associated blocking members 8d of the drainage cap 8, wherein the blocking elements 7d and the blocking members 8d illustratively define securing units 9 for securing the drainage caps 8 at the mounting units 7.

Figure 7:
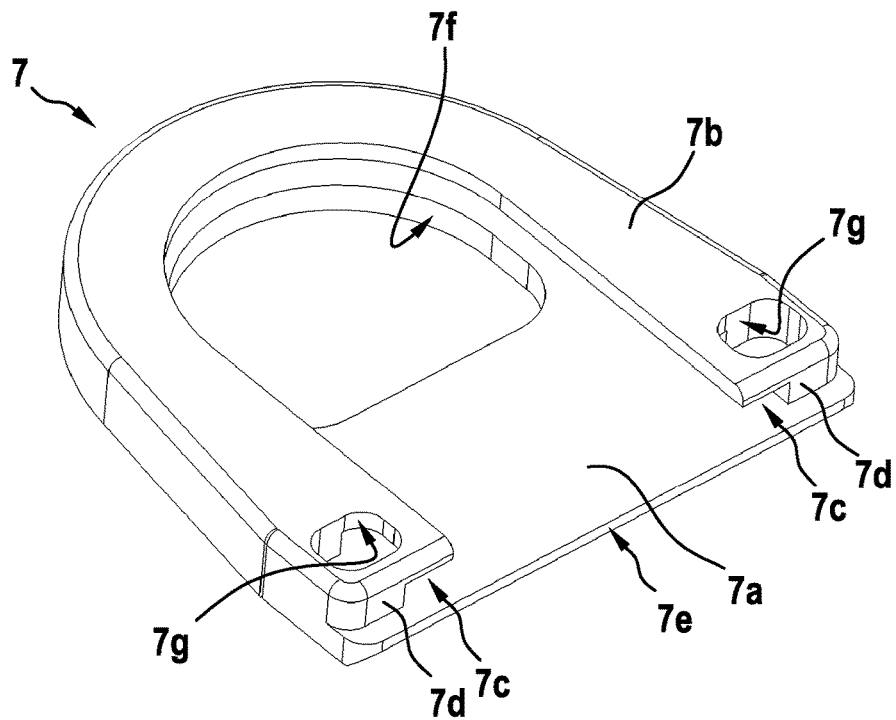
FIG. 7 shows the mounting unit of FIG. 6.

FIG. 7 shows the mounting unit 7 of FIG. 6 with the carrier 7a having the opening 7f, for further illustrating the retainer 7b with the guide 7c and the blocking elements 7d. According to one aspect, the retainer 7b is provided in the region of the blocking elements 7d, and more specifically adjacent to the blocking elements 7d, with control openings 7g. The latter preferably traverse the retainer 7b up to the carrier 7a, thereby defining the end stop-like blocking elements 7d.

It should be noted that the provision of the control openings 7g is advantageous if the mounting unit 7 is manufactured using a plastic injection molding process. In this case, the creation of undercuts can be avoided due to the traversing control openings 7g.

Preferably, the carrier 7a is provided with a slope 7e in the region of the blocking elements 7d. The slope 7e is at least adapted to reduce, and preferentially to prevent, ingress of liquids streaming along the outer shell 2c of FIG. 2 and FIG. 3 alongside the carrier 7a.

Figure 8:
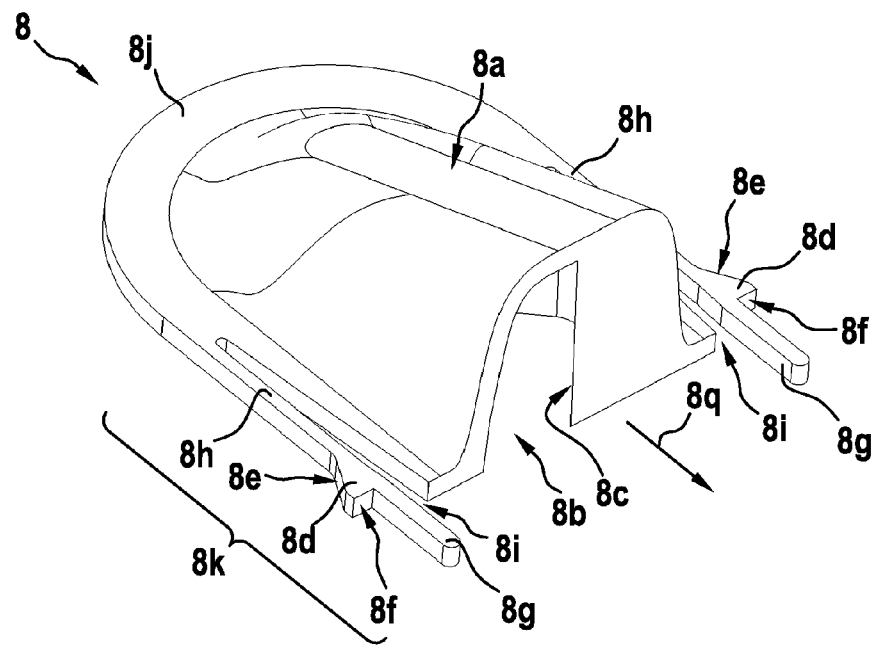
FIG. 8 shows a perspective top view of the drainage cap of FIG. 6.

FIG. 8 shows the drainage cap 8 of FIG. 6 with the housing 8a that comprises the collar 8j and that defines the drainage channel 8b and the fluid outlet 8c. Preferably, the collar 8j is at least approximately U-shaped for mating the shape of the guide 7c of the mounting unit 7 of FIG. 7.

According to one aspect, the at least approximately U-shaped collar 8j has two opposed legs that comprise at their free ends blocking member units 8k, which are illustratively stilt-shaped and preferably adapted for creating the above-mentioned snap-fit connection to the mounting unit 7 of FIG. 7. Therefore, each blocking member unit 8k comprises the blocking member 8d of FIG. 6 that is lockable by the blocking element 7d of the mounting unit 7 of FIG. 7.

Preferably, the blocking member 8d comprises a slope portion 8e and a stopper portion 8f. The stopper portion 8f abuts against the blocking element 7d of the mounting unit 7 of FIG. 7 in the mounted state of the drainage cap 8, as further described below with reference to FIG. 10.

According to one aspect, the blocking member 8d is at least attached to and preferably integrally, i.e. in one piece, formed with a rod-shaped flexure element in the form of a beam 8h of the blocking member unit 8k in a region of the beam 8h that is adjacent to a gap 8i provided in the collar 8j. By separating the beam 8h from the housing 8a of the drainage cap 8 by means of the gap 8i, an elastic deflection of the beam 8h in a direction transverse to the longitudinal extension of the drainage cap 8, which is illustrated by the arrow 8q, is enabled.

Preferably, the beam 8h is associated with an actuating lever 8g that is adapted to enable a manually forced deflection of the beam 8h, e.g. for removing the drainage cap 8 from the mounting unit 7 of FIG. 7. Illustratively, the actuating lever 8g is implemented by an integral axial extension of the beam 8h.

Figure 9:
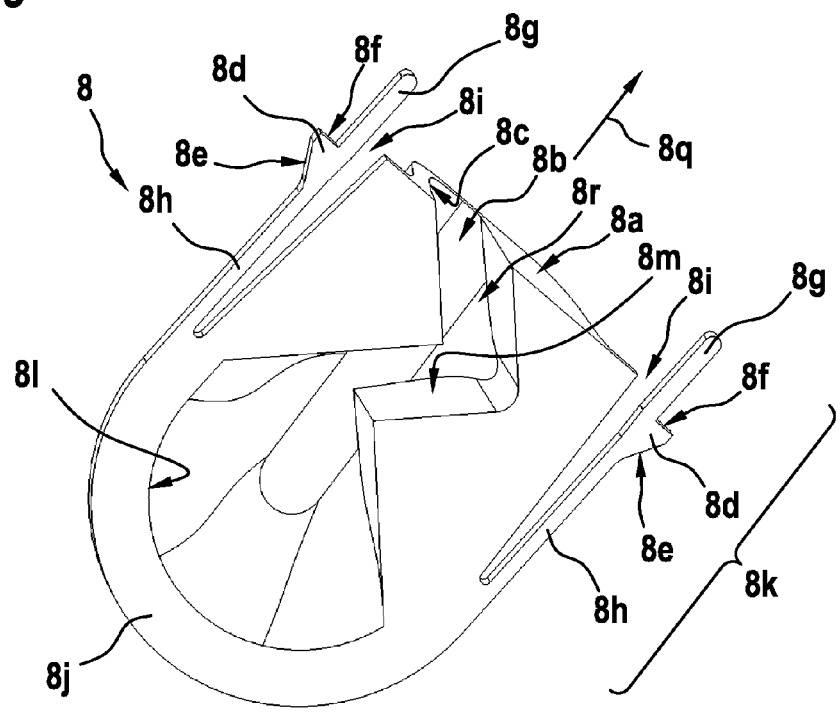
FIG. 9 shows a perspective bottom view of the drainage cap of FIG. 8.

FIG. 9 shows the drainage cap 8 with the drainage channel 8b of FIG. 8 for further illustrating the fluid inlet 8l, the blocking member units 8k with the gaps 8i, the beams 8h that comprise the blocking members 8d, and the actuating levers 8g, which axially extend from the beams 8h. Preferably, the blocking members 8d define saw tooth-like integral lateral extensions of the beams 8h, wherein the stopper portions 8f are at least approximately arranged perpendicular to a longitudinal extension of the beams 8h.

According to one aspect, the drainage channel 8b is at least partly zigzagged over the longitudinal extension 8q of said drainage cap 8. Preferably, the drainage channel 8b comprises channel walls 8m that may be chamfered and that are at least substantially perpendicular to a planar surface of the drainage cap 8 that is oriented towards the mounting unit 7 of FIG. 7 in mounted state according to FIG. 6. Accordingly, the channel walls 8m are at least substantially perpendicular to the mounting unit 7, i.e. its carrier 7a in said mounted state of the drainage cap 8 on the mounting unit 7. These channel walls 8m preferentially define at least one L-shaped channel section 8r, as described in more detail below with reference to FIG. 11.

Figure 10:
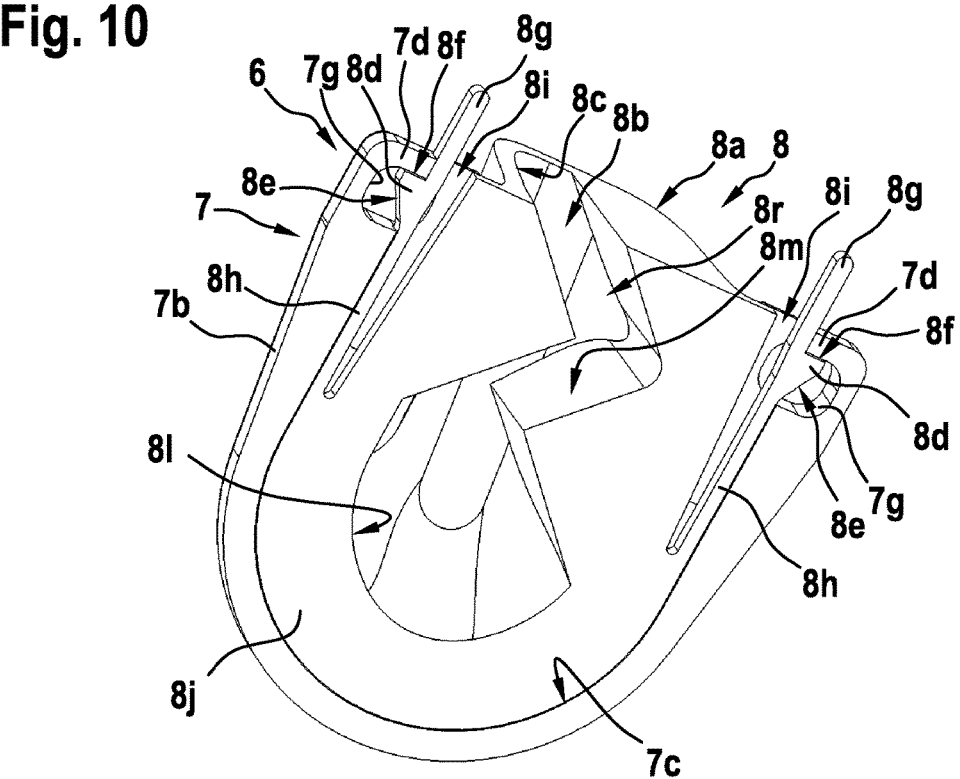
FIG. 10 shows the drainage cap of FIG. 9, which is snap-fitted to a retainer of the mounting unit of FIG. 6.

FIG. 10 shows the drainage cap 8 of FIG. 9 and the retainer 7b of the mounting unit 7 of FIG. 7 in mounted state. It should be noted that the retainer 7b is illustrated with the guide 7c of FIG. 7, while the carrier 7a of the mounting unit 7 of FIG. 7 has been omitted for clarifying the snap-fit connection between the drainage cap 8 and the retainer 7b according to the present invention. Accordingly, FIG. 10 highlights the blocking of the blocking members 8d of the drainage cap 8 by means of the blocking elements 7d of the retainer 7b.

More specifically, during mounting of the drainage cap 8 to the mounting unit 7 of FIG. 7, the collar 8j is inserted into the guide 7c and the drainage cap 8 is pushed into the retainer 7b. During pushing, the beams 8h are deflected inwardly when the slopes 8e of the blocking members 8d come into contact with the blocking elements 7d of the retainer 7b, such that the gaps 8i are at least partly closed by the beams 8h. Then, when the blocking members 8d have passed the blocking elements 7d, the beams 8h spring back into their initial positions, such that the blocking members 8d enter into the control openings 7g of the retainer 7b. Thus, the stopper portions 8f of the blocking members 8d abut against the blocking elements 7d so that an unintentional removal of the drainage cap 8 from the retainer 7b, and consequently from the mounting unit 7 of FIG. 7, is prevented.

For unmounting the drainage cap 8, the beams 8h are manually deflected inwardly. Thus, the abutment of the stopper portions 8f of the blocking members 8d against the blocking elements 7d is annulated and the drainage cap 8 can be pulled out of the retainer 7b.

Figure 11:
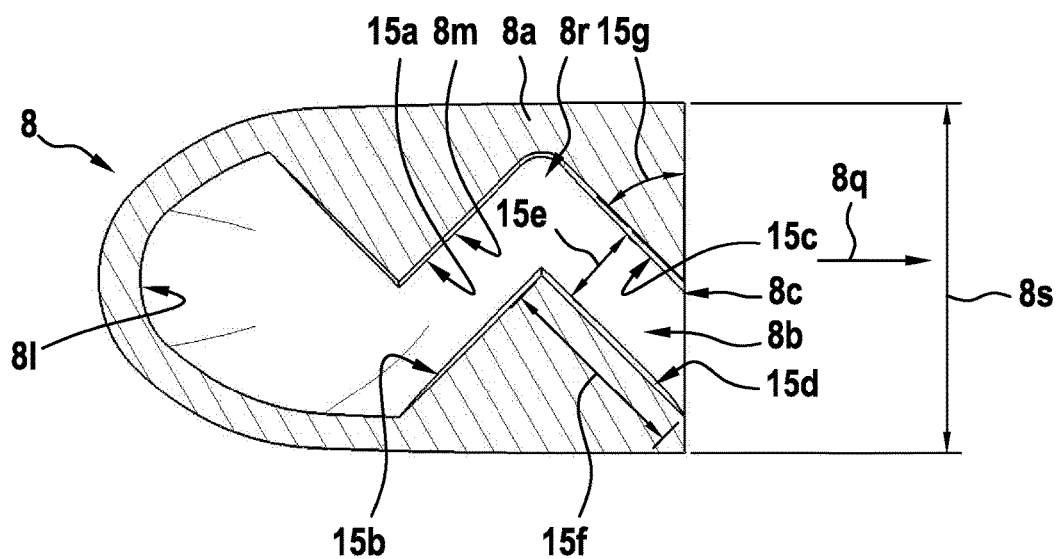
FIG. 11 shows a sectional view of the drainage cap of FIG. 6, seen in direction of arrows XI-XI of FIG. 3.

FIG. 11 shows the drainage cap 8 with the drainage channel 8b having the channel walls 8m defining the at least one L-shaped channel section 8r according to FIG. 9 and FIG. 10, for further illustrating the zigzagged drainage channel 8b. According to one aspect, the channel walls 8m comprise at least four wall segments 15a, 15b, 15c, 15d, which preferably define the at least one L-shaped channel section 8r. Therefore, at least two wall segments are at least essentially parallel to each other, and at least two wall segments are at least essentially perpendicular to each other. Illustratively, the wall segments 15a, 15b and the wall segments 15c, 15d are respectively parallel to each other, while the wall segments 15a, 15c and the wall segments 15b, 15d are respectively perpendicular to each other.

According to one aspect, at least two wall segments that are at least essentially parallel to each other, i.e. the wall segments 15a, 15b and/or the wall segments 15c, 15d, are spaced from one another by a distance 15e that defines a channel width. Preferably, this distance 15e amounts approximately to at least one third of an overall width 8s of the drainage cap 8. Furthermore, each one of the wall segments 15a, 15b, 15c, 15d preferably comprises a length 15f that is greater than the channel width 15e. Moreover, at least one of the wall segments 15a, 15b, 15c, 15d preferentially defines an angle 15g of at least approximately 45° with respect to the fluid outlet 8c of the drainage cap 8. Thus, it can be guaranteed reliably that any fluid, such as spray water, which ingresses into the drainage cap 8 through the fluid outlet 8c strikes a wall segment of the drainage channel 8b, in particular the wall segment 15d, which thus prevents the fluid from traversing the drainage channel 8b freely.

Figure 12:
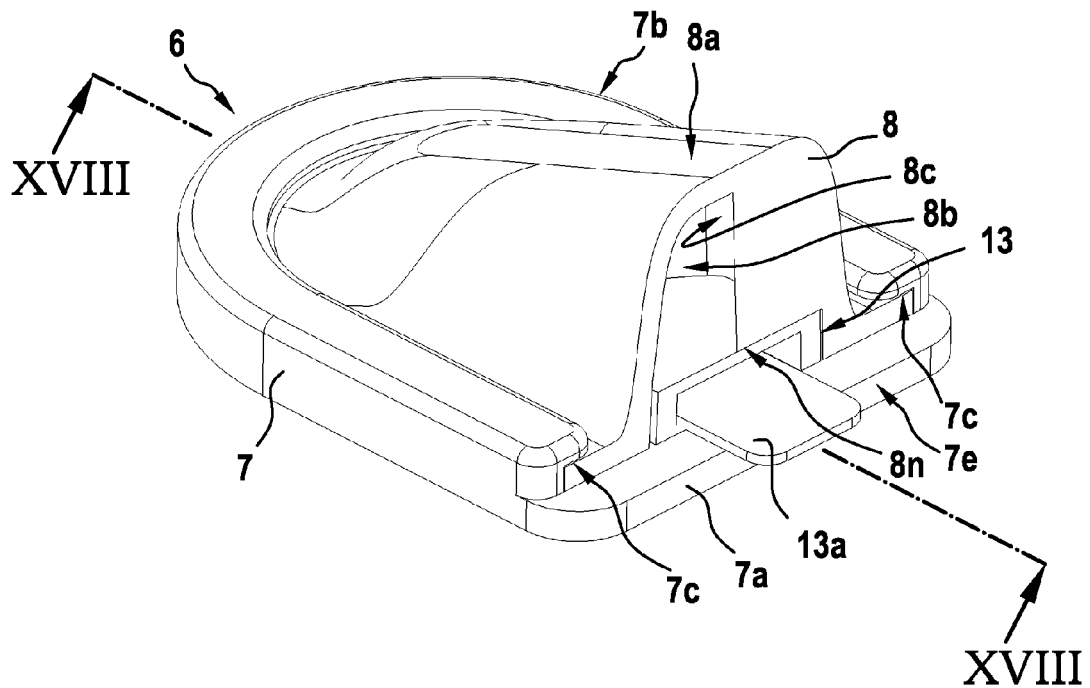
FIG. 12 shows the drainage end cap device of FIG. 2 that is embodied according to a second embodiment and comprises a mounting unit, a drainage cap and a fixation unit according to the second embodiment.

FIG. 12 shows the drainage end cap device 6 of FIG. 2 with the mounting unit 7 and the drainage cap 8, which are in FIG. 12 embodied according to a second embodiment of the present invention. According to this second embodiment, the drainage end cap device 6 further comprises a fixation unit 13 that is provided for creating the above-mentioned snap-fit connection between the drainage cap 8 and the mounting unit 7.

This fixation unit 13 illustratively comprises an elastically deflectable control lever 13a and is preferably removably mountable to the drainage cap 8 for retaining the drainage cap 8 at the mounting unit 7 in a mounted state. In order to allow mounting of the fixation unit 13 to the drainage cap 8, the latter is provided with a fixation unit receiving slot 8n.

It should be noted that the drainage end cap device 6 is shown in FIG. 12 in mounted state. Accordingly, the fixation unit 13 is only partly visible and is, therefore, described in more detail in below with reference to FIG. 14 and FIG. 15.

Figure 13:
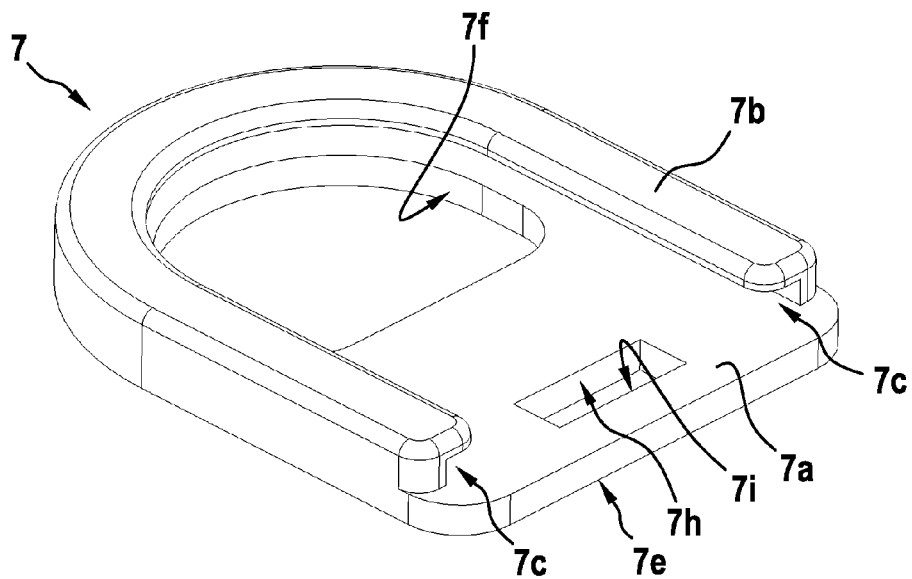
FIG. 13 shows the mounting unit of FIG. 12.

FIG. 13 shows the mounting unit 7 of FIG. 12, which is embodied according to the second embodiment. More specifically, the mounting unit 7 according to this second embodiment comprises a recess-type blocking element 7h with a blocking surface 7i instead of the end stop-type blocking elements 7d and the control openings 7g of the mounting unit 7 according to the first embodiment, as described above.

The recess-type blocking element 7h is preferably embodied as a through hole through the carrier 7a of the mounting unit 7. However, it may likewise be embodied in the form of a blind bore.

Figure 14:
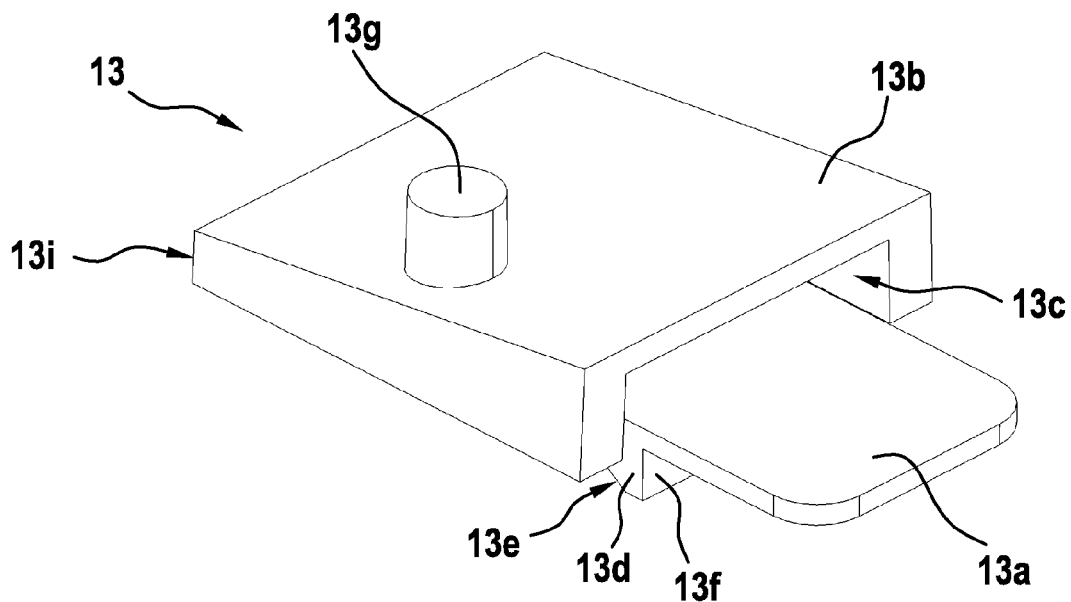
FIG. 14 shows a perspective top view of the fixation unit of FIG. 12.

FIG. 14 shows the fixation unit 13 with the elastically deflectable control lever 13a of FIG. 12. Illustratively, the fixation unit 13 has a housing 13b, which is preferably wedge-shaped and comprises a smaller axial end portion 13i that defines an abutting surface for abutment against the drainage cap 8 of FIG. 12 in mounted state. The control lever 13a protrudes from an opposed bigger axial end portion of the housing 13b.

According to one aspect, the housing 13b comprises an interior gap 13c adjacent to the control lever 13a that allows for an elastic deflection of the control lever 13a. Illustratively, the housing 13b is at least partly U-shaped with two outer flanks that encompass the interior gap 13c.

Preferably, the control lever 13a is embodied as a tongue-shaped flexure element and provided with at least one blocking member 13d. The latter is embodied similar to the blocking member 8d of FIG. 8 and, thus, comprises a slope portion 13e and a stopper portion 13f.

According to one aspect, the housing 13b further comprises a securing bolt 13g. The latter is preferably arranged on an outer surface of the housing 13b that is in contact with the drainage cap 8 of FIG. 12 in mounted state. Illustratively, the securing bolt 13g protrudes in a chimney-like manner from the housing 13b.

Figure 15:
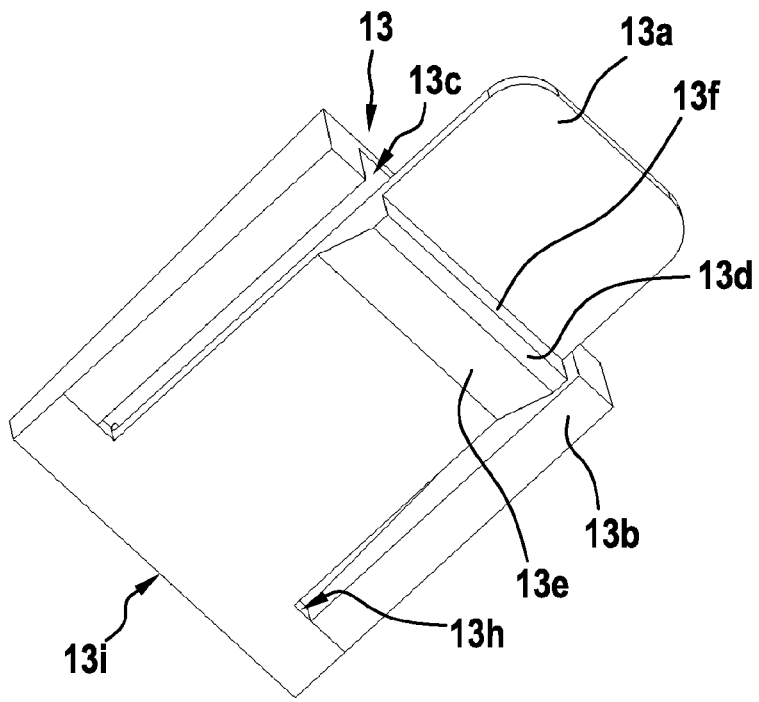
FIG. 15 shows a perspective bottom view of the fixation unit of FIG. 14.

FIG. 15 shows the fixation unit 13 of FIG. 14, with the control lever 13a and the housing 13b that defines the smaller axial end portion, i.e. the abutting surface, 13i. Illustratively, a connection zone 13h is embodied in the region of this abutting surface 13i where the control lever 13a is connected to the housing 13b.

According to one aspect, the fixation unit 13 is at least partly embodied using plastic material. Preferably, the fixation unit 13 is integrally, i.e. as a one-piece component, formed from plastic by means of a plastic injection molding process. In particular, a soft material with linear elastic behavior and high yield strength can be used for realization of the fixation unit 13.

Figure 16:
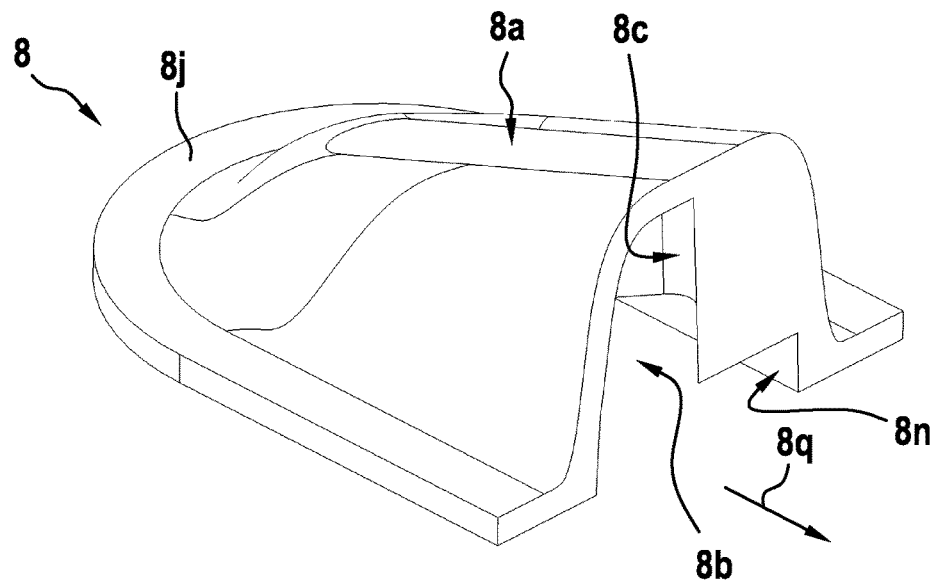
FIG. 16 shows a perspective top view of the drainage cap of FIG. 12.

FIG. 16 shows the drainage cap 8 of FIG. 12 with the housing 8a having the drainage channel 8b and the fluid outlet 8c of FIG. 12. FIG. 16 further illustrates the fixation unit receiving slot 8n.

Figure 17:
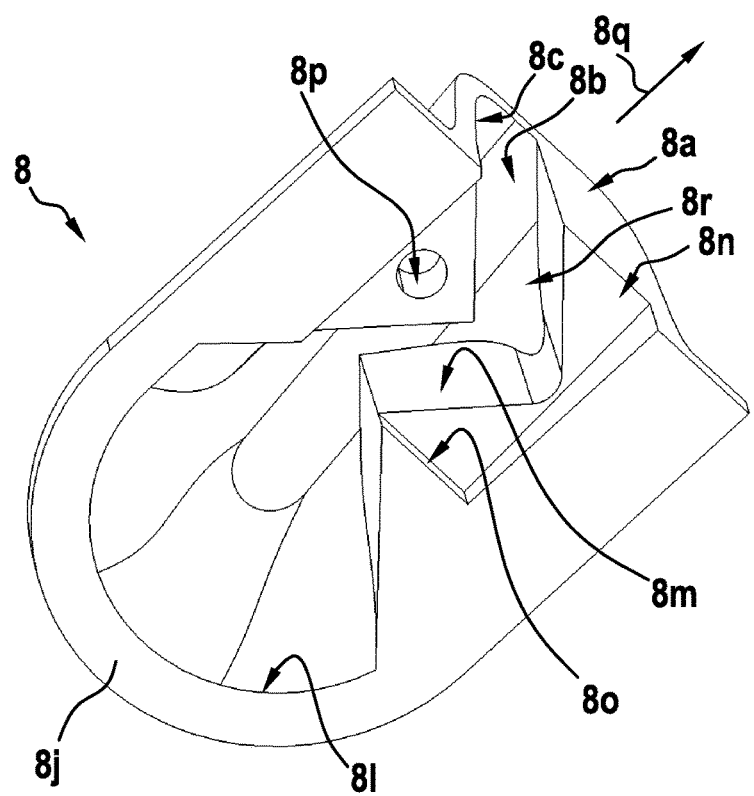
FIG. 17 shows a perspective bottom view of the drainage cap of FIG. 16.

FIG. 17 shows the drainage cap 8 of FIG. 16 with the housing 8a having the fixation unit receiving slot 8n. FIG. 17 further illustrates a securing bolt receiving opening 8p and an abutting surface 8o that are provided in the region of the fixation unit receiving slot 8n according to one aspect.

The securing bolt receiving opening 8p is illustratively embodied in the form of a blind bore and adapted to receive the securing bolt 13g of the fixation unit 13 of FIG. 14 in mounted state. The abutting surface 8o is preferably embodied for abutment against the abutting surface 13i of the fixation unit 13 of FIG. 14 in mounted state.

Figure 18:
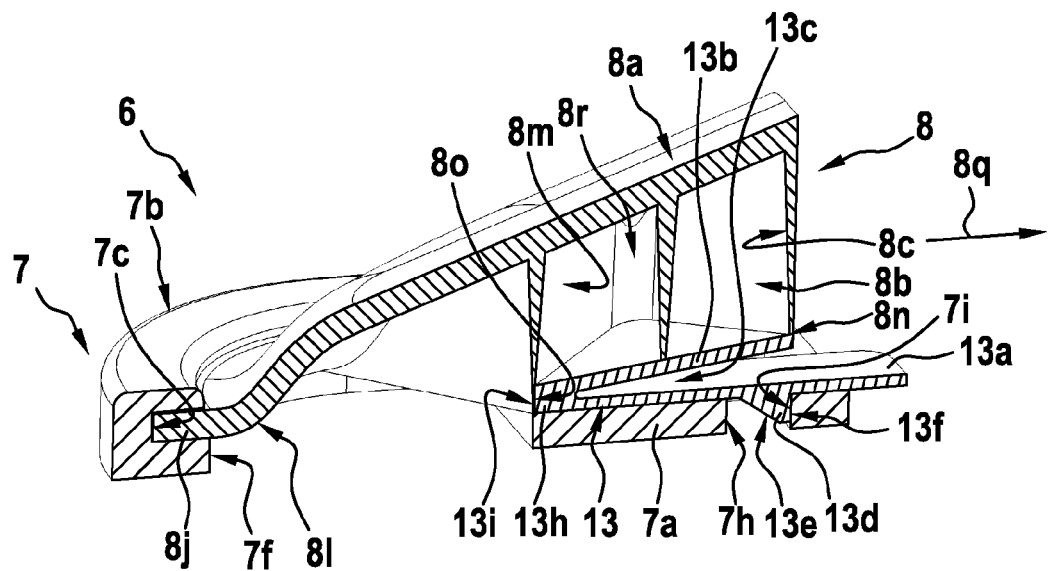
FIG. 18 shows a sectional view of the drainage cap of FIG. 12, which is snap-fitted to a retainer of the mounting unit of FIG. 12, seen in direction of arrows XVIII-XVIII of FIG. 12.

FIG. 18 shows the fixation unit 13 of FIG. 14 and FIG. 15, which is mounted together with the drainage cap 8 according to FIG. 16 and FIG. 17 to the mounting unit 7 according to FIG. 13. For mounting the drainage cap 8 to the mounting unit 7, initially the fixation unit 13 is positioned at the drainage cap 8 by means of the securing bolt 13g. Then, the drainage cap 8 and the fixation unit 13 are together pushed into the mounting unit 7, whereby the collar 8j is inserted into the guide 7c and whereby the drainage cap 8 is pushed into the retainer 7b.

During pushing, the control lever 13a is deflected upwardly when the slope 13e of its blocking member 13d comes into contact with the carrier 7a of the mounting unit 7, such that the gap 13c is at least partly closed by the control lever 13a. Then, when the blocking member 13d comes into the region of the recess-type blocking element 7h, the control lever 13a springs back into its initial position, such that the blocking member 13d enters into the blocking element 7h. Thus, the stopper portion 13f of the blocking member 13d abuts against the blocking surface 7i so that an unintentional removal of the drainage cap 8 from the retainer 7b, and consequently from the mounting unit 7, is prevented. In other words, in the mounted state the blocking element 7h of the mounting unit 7 blocks the fixation unit 13 and the latter blocks the drainage cap 8 at the mounting unit 7 by interaction of the abutting surfaces 13i and 8o.

It should be noted that the fixation unit 13 provides for a higher release force than the blocking member units 8k according to the first embodiment. This results essentially from the enlargement of the control lever 13a and the stopper portion 13f compared to the beams 8h and their stopper portions 8f.

For unmounting the drainage cap 8, the control lever 13a is manually deflected upwardly. Thus, the abutment of the stopper portion 13f of the blocking member 13d against the blocking surface 7i is annulated and the drainage cap 8 can be pulled out of the retainer 7b.

Figure 19:
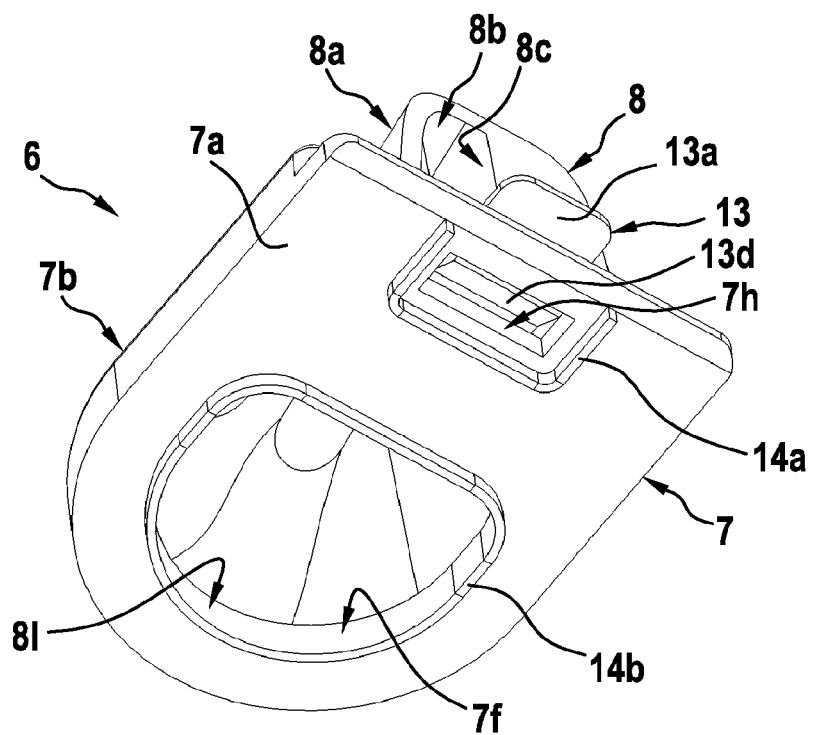
FIG. 19 shows a perspective bottom view of the drainage end cap device of FIG. 12 with spacers according to a first embodiment.

FIG. 19 shows the drainage end cap device 6 of FIG. 12 and FIG. 18 according to the second embodiment, wherein the mounting unit 7 is illustratively provided with ridge-shaped spacers 14a, 14b. The latter are adapted for creating a predetermined distance between the mounting unit 7 and the outer shell 2c of the fuselage 2 of FIG. 2 in mounted state and, therefore, point away from the drainage cap 8.

By way of example, the spacer 14a is U-shaped and arranged in the region of the recess-type blocking element 7h. The spacer 14b illustratively surrounds the opening 7f of the mounting unit 7.

Figure 20:
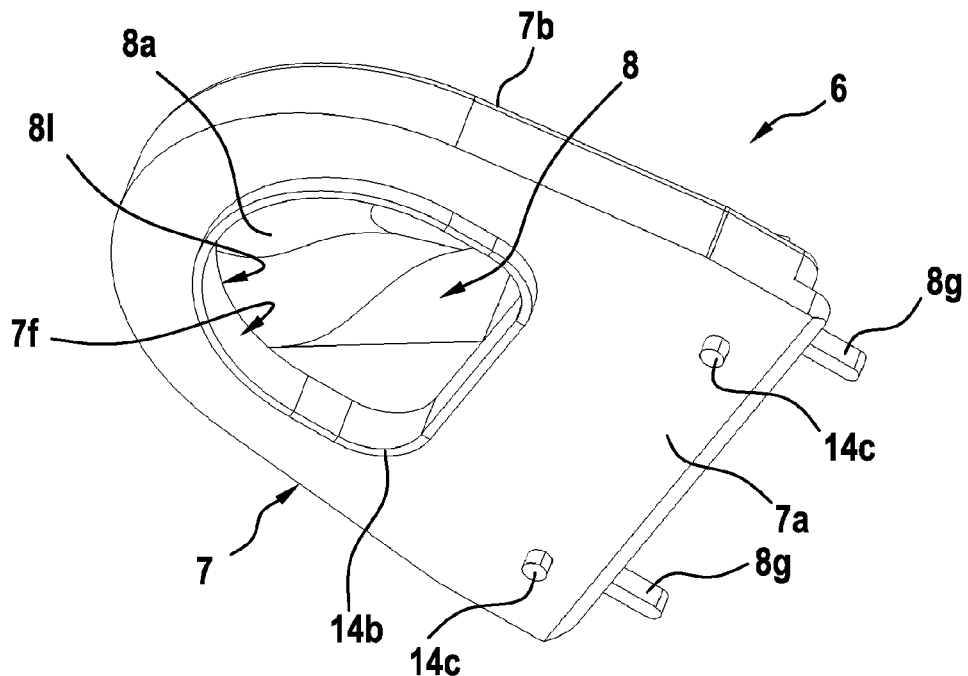
FIG. 20 shows a perspective bottom view of the drainage end cap device of FIG. 2 with spacers according to a second embodiment.

FIG. 20 shows the drainage end cap device 6 of FIG. 2 and FIG. 6 according to the first embodiment, wherein the mounting unit 7 is illustratively provided with the ridge-shaped spacer 14b of FIG. 19 and additional bolt-shaped spacers 14c.

Figure 21:
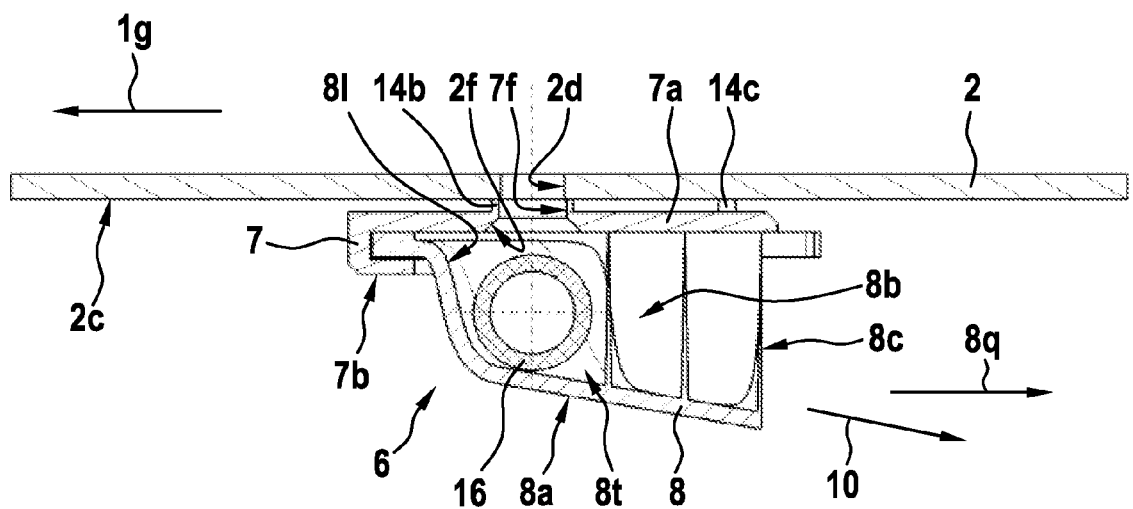
FIG. 21 shows the drainage end cap device of FIG. 3 with the spacers of FIG. 20 and a check valve in opened state according to one aspect.

FIG. 21 shows the arrangement of FIG. 3 with the drainage end cap device 6 having the drainage cap 8, which is mounted to the outer shell 2c of the fuselage 2 of the helicopter 1 of FIG. 1 by means of the mounting unit 7. By way of example, the mounting unit 7 is provided with the spacers 14b, 14c of FIG. 20.

According to one aspect, the drainage end cap device 6 is embodied in an end part 8t of the drainage cap 8, which is arranged in the region of the fluid inlet 8l of the drainage cap 8, as a check valve with a valve body 16. Illustratively, the valve body 16 is arranged inside the drainage channel 8b and, thus, surrounded by the housing 8a and the mounting unit 7. Once the drainage cap 8 with the valve body 16 is mounted on the matching unit 7 as illustrated, i.e. in mounted state of the drainage end cap device 6, the valve body 16 can only move within the end part 8t.

Preferably, the valve body 16 comprises an average density that is smaller than the density of water, such that the valve body 16 would be subject to lift when in contact with water and, consequently, swim on the water. However, the average density of the valve body 16 is preferably greater than the density of air, so that the valve body 16 would be pulled downwards by gravity in normal operation conditions of the helicopter 1 of FIG. 1. For instance, the valve body 16 may comprise an elastomeric material outside and a very light material inside the elastomeric material.

According to one aspect, the valve body 16 is embodied for sealingly closing the opening 7f in the carrier 7a of the mounting unit 7 under specific circumstances, such as ditching of the helicopter 1 of FIG. 1. Therefore, the valve body 16 is illustratively ball-shaped or spherical and the opening 7f is provided with a preferentially conical or spherical mating surface 2f. However, in FIG. 21 the opening 7f is illustrated in its opened state.

Figure 22:
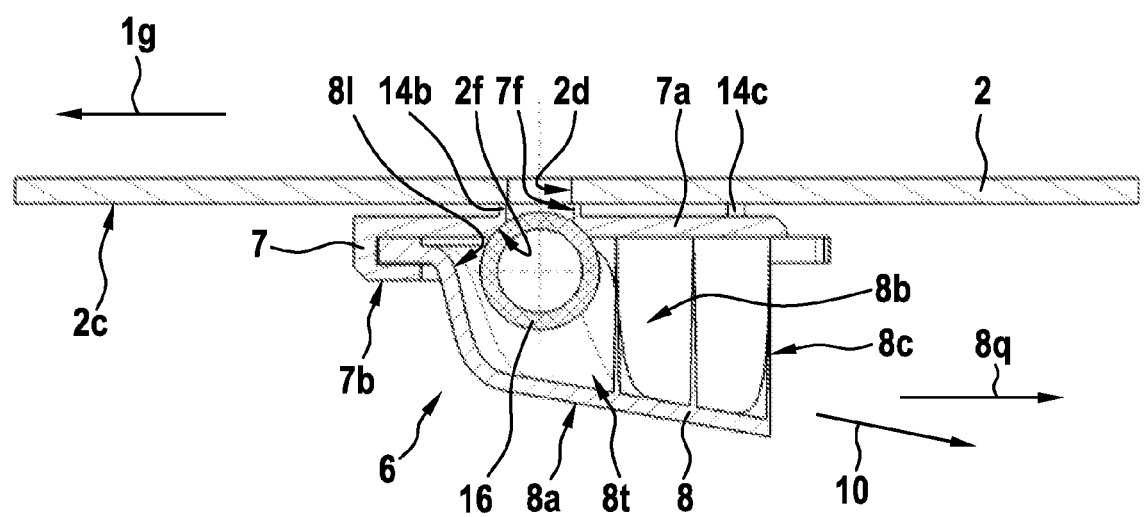
FIG. 22 shows the arrangement of FIG. 21 with the check valve in closed state.

FIG. 22 shows the arrangement of FIG. 21 with the drainage end cap device 6 that comprises the valve body 16 in mounted state. As mentioned above, the valve body 16 can only move within the end part 8t of the drainage cap 8. Thus, when water ingresses into the drainage channel 8b from outside, e.g. during ditching of the helicopter 1 of FIG. 1, the valve body 16 swims on the water and sealingly closes the opening 7f of the carrier 7a of the mounting unit 7 by contacting the mating surface 2f thereof. This is illustrated in FIG. 22, where the opening 7f is shown in its closed state. As soon as the water is drained out of the drainage channel 8b, the valve body 16 moves back into its position of FIG. 21 by gravity and therefore re-opens the opening 7f, as illustrated in FIG. 21.

It should be noted that modifications to the above described embodiments are within the common knowledge of the person skilled in the art and, thus, also considered as being part of the present invention. For instance, the fixation unit 13 of FIG. 14 and FIG. 15 can be screwed, riveted and/or glued to the drainage cap 8 of FIG. 16 and FIG. 17. Furthermore, the blocking member units 8k of the drainage cap 8 of FIG. 8 may alternatively by implemented as integral parts of the mounting unit 7 of FIG. 7. Moreover, suitable O-rings can be used for sealing the mounting unit 7 of FIG. 7 or FIG. 13 against the outer shell 2c of the fuselage 2 of FIG. 4, or for sealing the drainage cap 8 of FIG. 8 or FIG. 16 against the mounting unit 7, and so on.

REFERENCE LIST 1 aircraft
1a multi-blade main rotor
1b, 1c rotor blades
1d rotor head
1e rotor shaft
1f landing gear
1g main flight direction
2 fuselage
2a tail boom
2b cabin
2c outer wall
2d drainage openings
2e venting opening
2f mating surface
3 counter-torque device
4 bumper
5 fin
5a tail wing
6 drainage end cap device
6a
7 mounting unit
7a mounting carrier
7b drainage cap retainer
7c drainage cap guide
7d drainage cap blocking element
7e carrier slope
7f carrier drainage opening 7g control openings
7h recess-type blocking element
7i blocking surface
8 drainage cap
8a drainage cap housing
8b drainage channel
8c drainage cap outlet
8d drainage cap blocking member
8e blocking member slope
8f blocking member stopper
8g blocking member actuating lever
8h blocking member beam
8i blocking member gap
8j drainage cap collar
8k blocking member unit
8l drainage cap inlet
8m drainage channel walls
8n fixation unit receiving slot
8o drainage cap abutting surface
8p securing bolt receiving opening
8q drainage cap longitudinal extension direction
8r L-shaped channel section
8s drainage channel width
8t drainage channel end part
9 drainage cap securing units
10 drained fluid main flow direction
11a inner fuselage shell
11b hollow space
12 drainage cap height
13 drainage cap fixation unit
13a control lever
13b fixation unit housing
13c interior gap
13d control lever blocking member
13e blocking member slope
13f blocking member stopper
13g securing bolt
13h connection zone
13i fixation unit abutting surface
14a, 14b, 14c spacers
15a, 15b, 15c, 15d channel wall segments
15e channel width
15f segment length
15g segment angle
16 valve body

What is claimed is:

1. A drainage end cap device for an aircraft configured to drain fluid from a hollow space in the aircraft, the device comprising:
a mounting unit having a carrier defining an opening, the carrier defining a first mounting face configured to durably mount on an outer surface of an outer shell of the aircraft with the opening arranged congruent with a drainage opening of the aircraft, the carrier defining a second mounting face opposite to the first mounting face, the second mounting face defining a mounting plane, the mounting unit having a retainer extending peripherally around and away from the second mounting face and forming a guide groove between the retainer and the second mounting face; and
a drainage cap removably mounted to the mounting unit, the drainage cap having a housing defining a fluid inlet intersecting a cap mounting face and a fluid outlet intersecting a rear face, the fluid inlet and fluid outlet interconnected by a drainage channel, the cap mounting face configured to mate with the second mounting face of the mounting unit, the cap mounting face surrounded by a peripheral collar sized for receival by the guide groove of the mounting unit, wherein the fluid inlet intersects the cap mounting face, and wherein the housing is aerodynamically shaped over a longitudinal extension of the housing from the fluid inlet in a direction of the fluid outlet and the rear face;
wherein the drainage channel is zigzagged over the longitudinal extension of the housing such that the drainage channel has four wall segments extending substantially perpendicular to the mounting plane of the mounting unit and defining an L-shaped channel section configured such that fluid within the hollow space drains via the drainage channel to outside the aircraft and such that spray water ingressing into the drainage cap via the fluid outlet from outside the aircraft strikes at least one of the four wall segments and is prevented from traversing the drainage channel and reaching the hollow space of the aircraft.

2. The drainage end cap device according to claim 1, wherein the drainage cap is removably mounted to the mounting unit by means of a snap-fit connection.

3. The drainage end cap device according to claim 2, wherein the drainage cap comprises a blocking member unit that is adapted for creating the snap-fit connection to the mounting unit.

4. The drainage end cap device according to claim 3, wherein the blocking member unit comprises at least one blocking member that is lockable by an associated blocking element of the mounting unit.

5. The drainage end cap device according to claim 2, wherein a fixation unit is provided for creating the snap-fit connection to the mounting unit, the fixation unit removably mounted to the drainage cap for retaining the drainage cap at the mounting unit in a mounted state.

6. The drainage end cap device according to claim 5, wherein the fixation unit comprises at least one blocking member that is lockable by an associated blocking element of the mounting unit for blocking the fixation unit at the mounting unit, the fixation unit further comprising at least one fixation unit abutting surface that is adapted for abutting in the mounted state against an associated drainage cap abutting surface of the drainage cap for blocking the drainage cap at the mounting unit.

7. The drainage end cap device according to claim 1, wherein the housing of the drainage cap has a height that increases over a longitudinal extension of the drainage cap from the fluid inlet in direction of the fluid outlet.

8. The drainage end cap device according to claim 1, wherein two wall segments of the four wall segments of the drainage channel are parallel to each other, and wherein two wall segments of the four wall segments of the drainage channel are perpendicular to each other.

9. The drainage end cap device according to claim 8, wherein the two wall segments that are parallel to each other are spaced from one another by a distance that amounts to at least one third of an overall drainage cap width.

10. The drainage end cap device according to claim 9, wherein each one of the four wall segments comprises a length that is greater than the distance.

11. The drainage end cap device according to claim 10, wherein at least one of the four wall segments defines an angle of at least 45° with respect to the fluid outlet of the drainage cap.

12. The drainage end cap device according to claim 1, wherein the drainage cap comprises a transparent plastic.

13. The drainage end cap device according to claim 1, wherein the mounting unit is provided with at least one spacer that points away from the drainage cap in a mounted state of the drainage cap on the mounting unit.

* * * * *